United States Patent
Narayanaswami

(10) Patent No.: US 8,181,031 B2
(45) Date of Patent: May 15, 2012

(54) BIOMETRIC AUTHENTICATION DEVICE AND SYSTEM

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 11/831,957

(22) Filed: Aug. 1, 2007

(65) Prior Publication Data
US 2009/0037743 A1    Feb. 5, 2009

(51) Int. Cl.
G06F 21/00    (2006.01)
(52) U.S. Cl. ............................................. 713/186
(58) Field of Classification Search ............... None
See application file for complete search history.

(56) References Cited

U.S. PATENT DOCUMENTS

| | | | | |
|---|---|---|---|---|
| 7,506,172 B2 * | 3/2009 | Bhakta | ............... | 713/186 |
| 2002/0150283 A1 | 10/2002 | Mimura et al. | | |
| 2003/0115490 A1 | 6/2003 | Russo et al. | | |
| 2004/0205271 A1 * | 10/2004 | O'Hare et al. | ............... | 710/240 |
| 2005/0071646 A1 | 3/2005 | Hollingshead | | |
| 2006/0106646 A1 * | 5/2006 | Squilla et al. | ............... | 705/3 |
| 2006/0156418 A1 * | 7/2006 | Polozoff | ............... | 726/28 |
| 2006/0226990 A1 * | 10/2006 | Broad et al. | ............... | 340/573.1 |
| 2007/0016798 A1 | 1/2007 | Narendra et al. | | |
| 2007/0204335 A1 | 8/2007 | Zugenmaier et al. | | |
| 2007/0239991 A1 | 10/2007 | Cheng | | |

OTHER PUBLICATIONS

International Search Report dated Feb. 3, 2009.
Office Action dated Jan. 4, 2011 from U.S. Appl. No. 11/831,956.

* cited by examiner

*Primary Examiner* — Brandon Hoffman
(74) *Attorney, Agent, or Firm* — McGinn Intellectual Property Law Group, PLLC

(57) ABSTRACT

A biometric sensor device, a portable electronic device including an actuatable biometric input device, and method of biometric authentication that includes an input device that generates a signal or completes a circuit when actuated, and a biometric reader that reads a biometric of a user when the user actuates the input device to generate the signal or complete the circuit. An authentication section authenticates the biometric read on the biometric reader to generate one of a data access allowance function based on authentication of the biometric input to the actuatable biometric input device and a data access prevention function based on non-authentication of the biometric input to the actuatable biometric input device. The data access allowance function permits data to be accessed at the data access interface, and the data access prevention function prevents reading and/or access to data anywhere on the data storage and access device.

18 Claims, 4 Drawing Sheets

BIOMETRIC AUTHENTICATION DEVICE AND SYSTEM

CROSS-REFERENCE TO RELATED APPLICATIONS

This application is related to co-pending U.S. patent application Ser. No. 11/831,956 filed on Jul. 31, 2007 and entitled "METHOD OF BIOMETRIC AUTHENTICATION," the entire contents of which is incorporated herein by reference in its entirety without disclaimer.

BACKGROUND OF THE INVENTION

1. Field of the Invention

The present invention generally relates to a system that uses a biometric input device in combination with a manually actuated input device. An authentication section authenticates the biometric input to generate a data access allowance function or a data access prevention function based on non-authentication of the biometric input.

2. Description of the Related Art

Mobile cell phones and MP3 (Moving Picture Experts Group-1 Audio Layer 3)/MPEG (Moving Picture Experts Group) media player devices currently available include significant amounts of data storage. For example, many media players are available with an 80 GB hard disk drive. Additionally, several cellular phones and media players include up to 10 GB of flash memory for data storage. The amount of storage space in these mobile devices is expected to increase over time. As a consequence, people are storing sensitive data on these devices. This includes corporate and personal email, records of financial transactions, licensed music and movies, copies of government issued documents, financial and legal data, etc.

There is a need to protect the data on these devices since these small portable devices can be easily lost or misplaced. Additionally, since the devices often contain sensitive data, they may be stolen with the intent to retrieve the sensitive data. In the event a device is lost or stolen, the user wants to make it very difficult for the finder of the device to be able to obtain access to the data stored on the device. In order to meet this objective, the data on these devices may be encrypted with strong encryption techniques.

Present methods used to protect data on mobile devices include a numeric keypad lock typically provided on cell phones, and alphanumeric passwords on other mobile devices provided with keypads or thumb-pads. In most cases, data on the device is not itself encrypted but access to the data is prevented by disabling a data accessing application until an authorized password is supplied. The keypad based security schemes for mobile devices can typically be broken through brute force techniques. In some cases, the device may lock the user out after a few tries, but since the adversary has physical possession of the device he can attack it by bypassing this software and directly examining the storage device. For example, a storage card or hard disk drive inside the device may be removed and read from another system.

In the simplest security schemes, sometimes used on resource limited mobile devices, a password entered by a user is compared against a stored password, and if they match, the device allows access to the data on the device. This scheme is weak from the perspective of an attacker who can gain access to the data on the storage device and determine the correct password. In some cases, passwords are transformed by a one-way hash function and the resulting hashes are stored on the mobile device. When a user logs in with a password, the entered password is hashed and checked with the hash associated with the registered password for the user. An attacker who knows the hash function and the hash output can determine the password by trying different combinations of passwords and checking the resulting hashes. This task is able to be accomplished on a powerful computer fairly quickly. Alternatively, the attacker may simply bypass the password check altogether and access at the data directly by examining the memory contents.

Therefore, a safe way to protect stored data is through encryption using a strong encryption routine requiring very long passwords. However, when a user wants to use the device in a situation, he will need to supply a very long password. The stronger the encryption desired by the user, the longer a password will need to be supplied by the user which most likely will interfere with the user's normal operation of the media playback device. The playback device may be automatically locked after a predetermined period of non-use, but once the device is locked, the user must supply the password again. If the device is locked too often, the user will be easily annoyed since he must enter a long password again to regain operation of the device.

Thus, there exists a need for a device, system and method where encrypted data is stored in a data memory/storage device, and decryption of the encrypted stored data is accomplished by a user inputting a strong decryption key that the user can enter quickly and easily on the electronic device, (e.g., mobile phone, media playback device, etc.).

SUMMARY OF THE INVENTION

In view of the foregoing and other exemplary problems, drawbacks, and disadvantages of the conventional devices, systems and methods, an exemplary aspect of the present invention is to provide a device, system and method for allowing very secure authentication to take place quickly on the data storage and access device with minimal interference to the user's operation of the device.

An exemplary aspect of the present invention includes a biometric authentication device including an input device that one of generates a signal and completes a circuit when the input device is actuated, and a biometric reader that reads a biometric of a user when the user actuates the input device to one of generate the signal and complete the circuit.

Another exemplary aspect of the present invention includes an authentication function that authenticates the read biometric to generate one of a data access allowance function based on authentication of the read biometric and a data access prevention function based on non-authentication of the read biometric.

Another exemplary aspect of the present invention includes the data access allowance function permits contents of a storage device to be accessed, and wherein the data access prevention function prevents access to contents of the storage device.

Another exemplary aspect of the present invention includes the data access prevention function prevents unauthorized access to data in the storage device, and prevents reading of the data in the storage device.

Another exemplary aspect of the present invention includes a thermal sensor that determines a thermal presence of the user on the input device.

Another exemplary aspect of the present invention includes the biometric includes at least one of a fingerprint, hand geometry, a hand vein pattern, a retinal pattern, an iris pattern, facial geometry, and a facial thermogram.

Another exemplary aspect of the present invention includes a portable electronic device including an actuatable biometric input device comprising an input device that one of generates a signal and completes a circuit when actuated, and a biometric reader that reads a biometric of a user when the user actuates the input device to one of generate the signal and complete the circuit, a data storage and access device comprising a storage device that stores data, a data access interface that allows data to be accessed by a user, and an authentication section that authenticates the biometric read on the biometric reader to generate one of a data access allowance function based on authentication of the biometric input to the actuatable biometric input device, and a data access prevention function based on non-authentication of the biometric input to the actuatable biometric input device, wherein the data access allowance function permits data in the data storage and access device to be accessed at the data access interface, and wherein the data access prevention function prevents access to data in the data storage and access device.

Another exemplary aspect of the present invention includes a decryption section that decrypts the data in the data storage and access device when the authentication function generates the data access allowance function for the user to access decrypted data, and an encryption section that encrypts the data of the data storage and access device when the authentication function generates the data access prevention function thereby preventing a user from accessing the data.

Another exemplary aspect of the present invention includes a timer section that sets a countdown timer after the data access allowance function prepares the data to be accessed.

Another exemplary aspect of the present invention includes a timer suspension section that suspends the countdown timer when the timer suspension section determines the existence of a specific condition, and a timer reset section that resets an interval of the countdown timer when the timer reset section determines the existence of a specific condition.

Another exemplary aspect of the present invention includes the specific condition includes at least one of when a re-authentication is made by a user on the biometric actuatable biometric input device, when a functional control is activated by a user on the data storage and access device, when decrypted data is accessed at the data access interface by the user, and when an auxiliary device capable of accessing the decrypted data is in communication with the data storage and access device.

Another exemplary aspect of the present invention includes an auxiliary device in communication with the data storage and access device, wherein the auxiliary device includes at least one of a wired and a wireless device in communication with the data storage and access device.

Another exemplary aspect of the present invention includes the auxiliary device further includes a sensor that determines when the auxiliary device is in contact with the user, wherein the specific condition includes when the sensor determines the auxiliary device is not in contact with the user.

Another exemplary aspect of the present invention includes a portable electronic device comprising a data storage device that stores data, a data access interface that allows the data to be accessed by a user, at least one input device that one of generates a signal and initiates a function when actuated, a biometric reader that reads a biometric of a user when the user actuates the at least one input device to one of generate the signal and initiate the function, a decryption section that decrypts the stored data when an authentication section determines a user may access the decrypted data based on an authenticated biometric input to the biometric reader, and an encryption section that encrypts the data when the authentication section determines the user is prevented from accessing the data based on a non-authenticated biometric input to the biometric reader.

Another exemplary aspect of the present invention includes the biometric includes at least one of a fingerprint, hand geometry, a hand vein pattern, a retinal pattern, an iris pattern, facial geometry, and a facial thermogram.

Another exemplary aspect of the present invention includes a timer section that sets a countdown timer after the decrypted data is accessed, wherein the data is encrypted by the encryption section after the countdown timer has expired.

Another exemplary aspect of the present invention includes a timer suspension section that suspends the countdown timer when a specific condition exists, and a timer reset section that resets an interval of the countdown timer when a specific condition exists.

Another exemplary aspect of the present invention includes the specific condition includes at least one of when an authenticated biometric is read by the biometric reader, when a functional control is activated by a user on the data storage and access device, when decrypted data is being accessed by the user, and when an auxiliary device capable of accessing the decrypted data is in communication with the data storage and access device.

Another exemplary aspect of the present invention includes an auxiliary device in communication with the data storage and access device, wherein the auxiliary device further includes at least one of a wired and a wireless communication device with the data storage and access device, and a sensor that determines when the auxiliary device is in contact with the user, wherein the specific condition further includes when the sensor determines the auxiliary device is not in contact with the user.

Another exemplary aspect of the present invention includes a biometric authentication device, comprising input means for one of generating a signal and completing a circuit when the input means is actuated, and biometric reading means for reading a biometric of a user when the user actuates the input means to one of generate the signal and complete the circuit.

Another exemplary aspect of the present invention includes a method of biometric authentication to selectively allow access to data on a data storage and access device, the method comprising actuating an input device, to one of generate a signal and complete a circuit, reading a biometric of a user on a biometric reader on the biometric sensor input device to determine whether to allow access to the data, determining an authentication status of the read biometric, decrypting encrypted data stored in the data storage and access device to allow access to the data based on determining whether the read biometric is authentic, initiating a countdown timer, determining when the countdown timer has expired, and encrypting data stored in the data storage and access device based on determining when the countdown timer has expired.

Another exemplary aspect of the present invention includes removing a data decryption key from a memory location on the data storage and access device based on determining when the countdown timer is expired.

Another exemplary aspect of the present invention includes one of suspending and resetting the countdown timer based on at least one of when an authenticated biometric is determined to have been read by the biometric reader, when at least one functional control is activated by a user on the data storage and access device, when the decrypted data is being accessed by the user, and when an auxiliary device capable of accessing the decrypted data is in communication with the data storage and access device.

Another exemplary aspect of the present invention includes determining whether a data decryption key exists used to decrypt the encrypted data, and one of retrieving a stored data decryption key and creating a data decryption key to decrypt the encrypted data.

Another exemplary aspect of the present invention includes deriving the data decryption key from an authenticated biometric read on the biometric reader.

Another exemplary aspect of the present invention includes allowing access on the data storage and access device to the decrypted data based on determining that the read biometric is authentic.

Another exemplary aspect of the present invention includes initiating the countdown timer is based determining an authentication status after receiving a keystroke on the biometric sensor input device.

Another exemplary aspect of the present invention includes a method of biometric authentication to provide and restrict access to data on a data storage and access device, the method comprising receiving an input actuation on an actuatable biometric input device to one of generate a signal and complete a circuit, reading a biometric of a user when the user actuates the actuatable biometric input device, authenticating the biometric based on comparing the biometric to pre-stored authentication data, allowing access by the user to data stored in the data storage and access device based on the authenticating the biometric, initiating a countdown timer based on the allowing access to the data, one of suspending and resetting the countdown timer based on a predetermined condition, determining when the countdown timer has expired, and preventing access to the data stored in the data storage and access device when the countdown timer is determined to have expired.

Another exemplary aspect of the present invention includes the allowing access to the stored data further includes decrypting encrypted data stored in the data storage and access device.

Another exemplary aspect of the present invention includes deriving a data decryption key from an authenticated biometric read on the biometric reader to decrypt the encrypted data.

Another exemplary aspect of the present invention includes the predetermined condition includes at least one of when an authenticated biometric is read by the biometric reader, when at least one functional control is activated by a user on the data storage and access device, when data is being accessed by the user, and when communication exists between the data storage and access device and an auxiliary device capable of accessing the data.

Another exemplary aspect of the present invention includes the preventing access to the data further includes encrypting the data stored in the data storage and access device based on determining when the countdown timer has expired.

Another exemplary aspect of the present invention includes the preventing access to the data further includes removing a data decryption key from a memory location on the data storage and access device based on determining when the countdown timer has expired.

Another exemplary aspect of the present invention includes determining the biometric is not authenticated, and preventing access to data stored in the data storage and access device based on the determining the biometric is not authenticated.

Another exemplary aspect of the present invention includes preventing access to the data maintains encrypted data in the data storage and access device in an encrypted state.

Another exemplary aspect of the present invention includes a method of biometric authentication on a portable data storage and access device to selectively allow access to data on the portable data storage and access device, the method comprising providing an input device that one of generates a signal and completes a circuit when the input device is actuated, providing a biometric reader that reads a biometric of a user when the user actuates the input device to one of generate the signal and complete the circuit.

Another exemplary aspect of the present invention includes actuating an input device, to one of generate a signal and complete a circuit.

Another exemplary aspect of the present invention includes reading a biometric of a user on a biometric reader on the biometric sensor input device to determine whether to allow access to the data.

Another exemplary aspect of the present invention includes determining an authentication status of the read biometric.

Another exemplary aspect of the present invention includes decrypting encrypted data stored in the data storage and access device to allow access to the data based on determining whether the read biometric is authentic.

Another exemplary aspect of the present invention includes initiating a countdown timer.

Another exemplary aspect of the present invention includes determining when the countdown timer has expired.

Another exemplary aspect of the present invention includes encrypting data stored in the data storage and access device based on determining when the countdown timer has expired.

With its unique and novel features, the present invention provides a device, system and method for a biometric authentication system provided with a biometric sensor function including an input device and a biometric (e.g., fingerprint biometric, retinal scan, etc.) reader that reads a biometric (e.g., fingerprint biometric of a finger, retinal of a retinal scan) that is actuated on the input device. An authentication function authenticates the biometric (e.g., fingerprint biometric, retinal scan, etc.) to generate either a data access allowance function-based authentication of the biometric (e.g., fingerprint biometric, retinal scan, etc.), or a data access prevention function based on the non-authentication of the biometric (e.g., fingerprint biometric, retinal scan, etc.).

In the example of the biometric being a fingerprint biometric, a user exemplarily authenticates their fingerprint biometric to a data storage and access device using a sensor key actuatable biometric input device that includes a fingerprint biometric reader/scanner. A novel aspect of the invention is the fingerprint biometric sensor is preferably included on a key or and operating button of the data storage and access device. The action of authentication and using the device are combined and the user does not have to first authenticate on the fingerprint biometric sensor and then secondarily actuate a function button. Additionally, the sensor key actuatable biometric input device may determines the "liveness," e.g., of a finger, through a temperature sensor on the sensor key actuatable biometric input device so that false biometrics cannot be authenticated.

Whenever the user actuates the sensor key actuatable biometric input device to perform a function on the data storage and access device, the device is authenticated and content can be decrypted using a key derived from the user's fingerprint biometric or a key that is protected by the user's fingerprint biometric. Once the device is authenticated, a timer is set that will expire after a predetermined time interval. When the timer expires, the contents in the memory of the device are re-encrypted and the encryption key is removed from the RAM of the device.

It is noted that while the exemplary embodiment describes a biometric of a fingerprint biometric, any physiological biometric measurement may be easily tailored to the invention including a retinal pattern, iris pattern, facial geometry, facial thermogram, hand geometry or hand veins, etc.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1A:
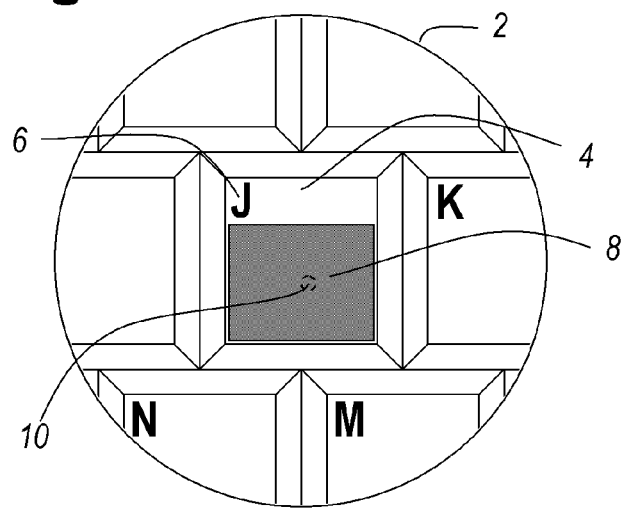
FIG. 1A illustrates a first exemplary embodiment of the biometric authentication device, according to a first configuration of an exemplary aspect of the present invention.

Referring now to the drawings, and more particularly to FIGS. 1A-4, there are shown exemplary embodiments of the method and structures of the present invention.

FIGS. 1A-1G illustrate a first exemplary embodiment of the biometric authentication device, according to multiple exemplary configurations of the present invention that provides an actuatable biometric input device including the combination of an input device and a biometric reader that in this exemplary embodiment reads a fingerprint of a user's finger when operating the input device or input key.

FIG. 1A illustrates a first configuration of the first exemplary embodiment of the biometric authentication device which provides a partial view 2 of a keyboard input device. A actuating device 4 may function in a manner of a key for a computer keyboard or terminal keyboard interface device in that when the actuating device 4 is actuated, a circuit is completed that generates a key scan code corresponding to a particular alphanumeric symbol 6. Alternatively, sensor key actuatable biometric input device 4 may generate an electronic signal that represents a particular function or command to be input into an electronic device.

A biometric reader 8 is integrally adapted to be positioned on an exterior surface of the actuating device 4 such that when a user actuates the actuating device 4 with a finger, a biometric reader 8 reads a biometric of a user during the keystroke. For example, FIG. 1A demonstrates that a right index finger of a user in the home position on the keyboard would cause the right index finger's fingerprint biometric to be scanned by the biometric reader 8 when it actuates the actuating device 4 to output the alphanumeric "J" character.

Additionally, in this configuration and in subsequent configurations, a thermal sensor 10 may be embedded in a portion of the actuating device 4 where a user's finger typically makes contact with the top surface of the actuating device 4, for example, on the top surface of the biometric reader 8. The thermal sensor 10 may determine the presence of the user's finger to verify the actual presence of a user thereby preventing any attempt to use an unauthorized replication of any biometric input.

Figure 1B:
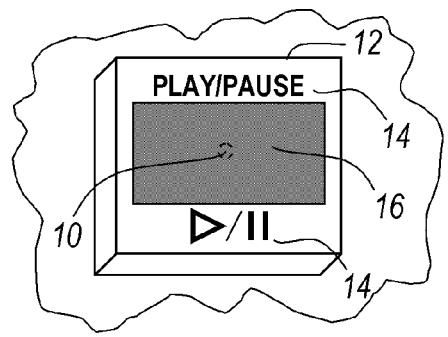
FIG. 1B illustrates a first exemplary embodiment of the biometric authentication device, according to a second configuration of an exemplary aspect of the present invention.

FIG. 1B illustrates a second configuration of the first exemplary embodiment of the biometric authentication device providing a pushbutton key 12 that may be used in conjunction with an electronic device. The pushbutton key 12 may have graphical indicia 14 used to identify to a user the function of the pushbutton key 12 in association with an electronic device. A biometric reader 16 occupies a central top portion of the pushbutton key 12 such that when the user contacts a finger on the pushbutton key 12 to actuate a particular function of an electronic device, the biometric reader 16 may read the user's fingerprint biometric.

Figure 1C:
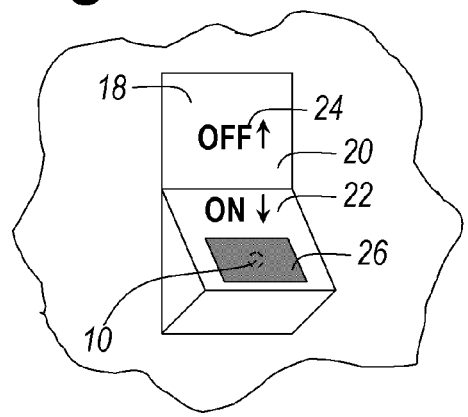
FIG. 1C illustrates a first exemplary embodiment of the biometric authentication device, according to a third configuration of an exemplary aspect of the present invention.

FIG. 1C illustrates a third configuration of the first exemplary embodiment of the biometric authentication device providing a toggle type switch 18 that may be used in conjunction with an electronic device or system. The switch 18 may include at least two positions 20 and 22 and may be identified by graphical indicia 24 indicating the functions operated by each of the two positions. A biometric reader 26 occupies a central portion at least one switch surface 22 of the toggle switch 18 such that when the user contacts a finger on the toggle switch 18 to operate a particular function of an electronic device, the biometric reader 26 may read the user's fingerprint biometric.

Figure 1D:
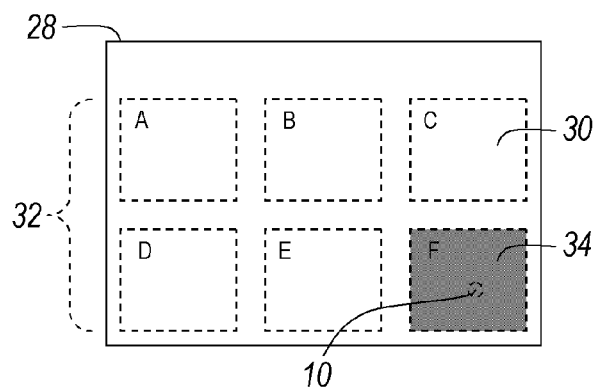
FIG. 1D illustrates a first exemplary embodiment of the biometric authentication device, according to a fourth configuration of an exemplary aspect of the present invention.

FIG. 1D illustrates a fourth configuration of the first exemplary embodiment of the biometric authentication device providing a flat panel type switch 28 that may be used in conjunction with an electronic device or system. A flat panel type switch 28 may be a touch screen input device providing a touch sensitive surface that is not activated by the deflection of a key as in the above configurations of FIGS. 1A-1C, but by the contact of a user's finger against a touch sensitive input device. A flat panel type switch 28 may provide one or a number of switches 30, (denoted by reference numbers A-F), in a switch area 32 that are defined by a region having a particular horizontal and vertical component width. A biometric reader 34 may overlap any switch 30 or portion of a switch, such that when a user contacts a finger on a switch having the biometric reader 34 thereon, in this case switch "F", the biometric reader 34 may read the user's fingerprint biometric.

Figure 1E:
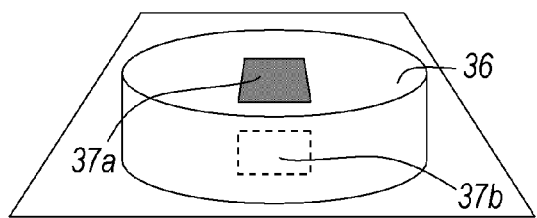
FIG. 1E illustrates a first exemplary embodiment of the biometric authentication device, according to a fifth configuration of an exemplary aspect of the present invention.

FIG. 1E illustrates a fifth configuration of the first exemplary embodiment of the biometric authentication device providing a rotary dial-type input device 36 that may be used in conjunction with an electronic device or system. A rotary dial input device 36 may include a biometric reader 37a mounted on a top surface of the dial 36, or may include a biometric reader 37b in an alternative location on a side surface of the rotary dial 36. Either configuration allows for the reading of a fingerprint biometric while actuating the dial in a rotary direction.

Figure 1F:
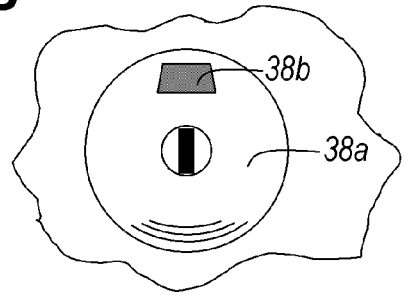
FIG. 1F illustrates a first exemplary embodiment of the biometric authentication device, according to a sixth configuration of an exemplary aspect of the present invention.

FIG. 1F illustrates a sixth configuration of the first exemplary embodiment of the biometric authentication device providing a knob 38a including a biometric reader 38b. Knob 38a may include a rotary knob that either mechanically or electronically provides a signal to activate the unlocking of a door lock or another closure device. The biometric reader 38b allows for the reading of a fingerprint biometric while actuating the knob in a rotary direction.

Figure 1G:
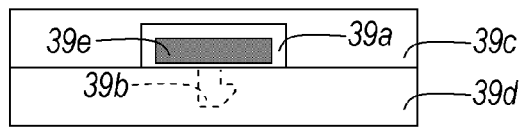
FIG. 1G illustrates a first exemplary embodiment of the biometric authentication device, according to a seventh configuration of an exemplary aspect of the present invention.

FIG. 1G illustrates a seventh configuration of the first exemplary embodiment of the biometric authentication device providing a sliding latch 39a having a latching protrusion 39b for joining a first element 39c to a second element 39d in a detachable latching configuration. The sliding latch 39a may include a biometric reader 39e that allows for reading a biometric while a user actuates the latch in a sliding direction to separate the first element 39c from the second element 39d.

Figure 2:
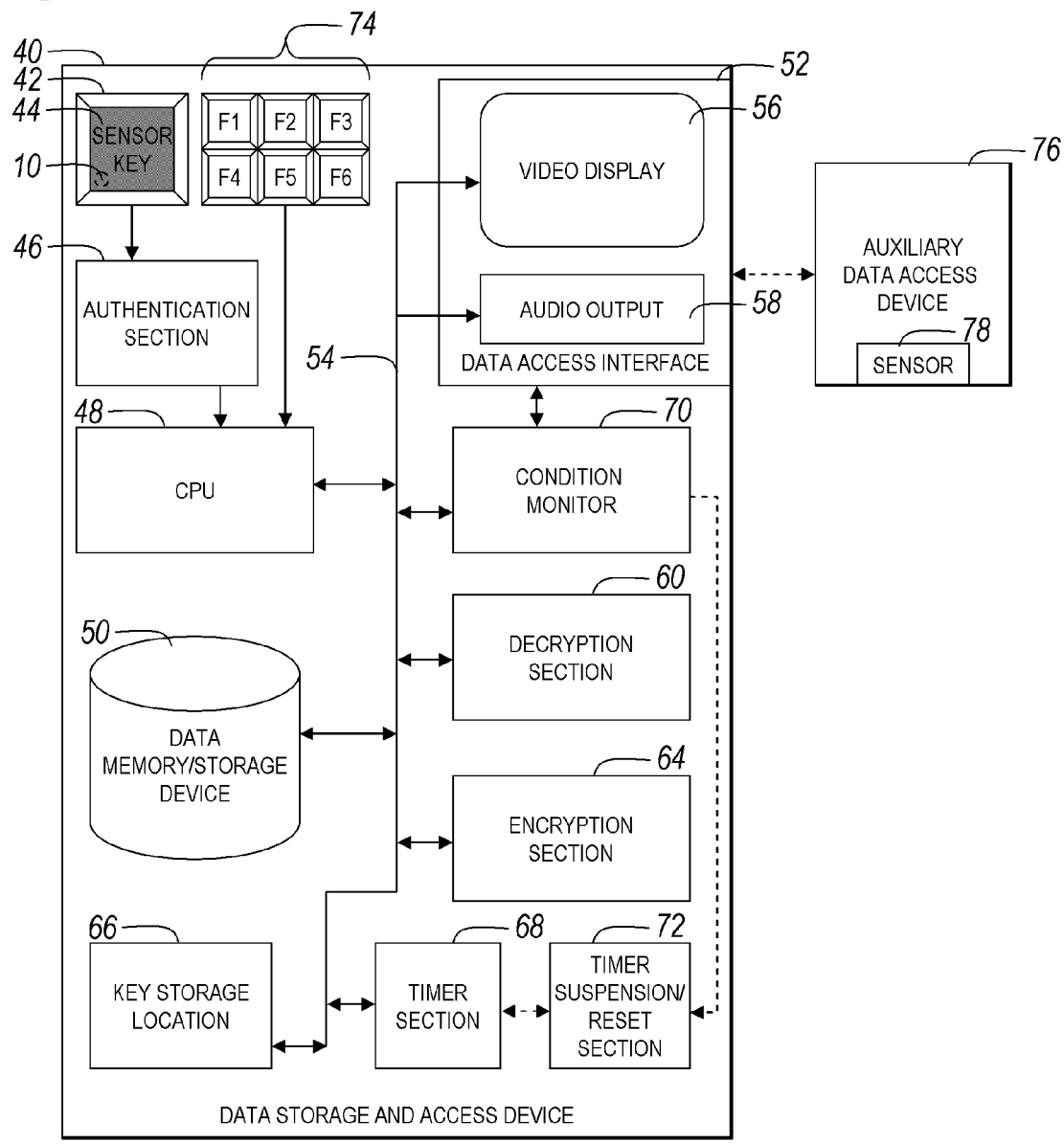
FIG. 2 illustrates a second exemplary embodiment of the biometric authentication device, according to an exemplary aspect of the present invention.

FIG. 2 illustrates a second exemplary embodiment of present invention incorporating the actuatable authentication biometric input device as disclosed above in FIGS. 1A-1D in combination with a data storage and access device.

A general configuration of the second exemplary embodiment of the biometric authentication system provides an actuatable biometric input device 42 similar to the keys discussed above in FIGS. 1A-1D on a data storage and access device 40. The actuatable biometric input device 42 provides a key or switch to either complete a circuit or generate a signal when activated by the finger of a user and a biometric reader 44, e.g., a key with biometric sensor (sensor key), reads the fingerprint biometric of a user when operating the actuatable biometric input device 42. Additionally, a thermal sensor 10 may determine a presence of a user thereby preventing any attempt to use an unauthorized replication of a fingerprint biometric.

An authentication section 46 determines whether the biometric read by the biometric reader 44 is authentic or not compared to pre-stored biometric identification data.

A central processing unit (CPU) 48 receives a signal from the authentication section 46 once authentication section 46 has determined whether a biometric read on the biometric reader 44 is authentic or not. If a comparison between a pre-stored biometric identification data matches a biometric read by the biometric reader 44, then data stored in the data memory/storage device 50 is made accessible to the user via the data access interface 52 via a data bus 54 at either a video display 56 and/or an audio output 58.

The data in the memory/storage device 50 is made accessible to the user at the data access interface 52 by causing the data in the memory/storage device 50 to be decrypted by a decryption section 60 connected to CPU 48 and the data memory/storage device 50 via a system bus 54.

However, if a comparison between the pre-stored biometric identification data does not match a biometric read by the biometric reader 44, the data stored in the data memory/storage device 50 is prevented from being accessed by a user at the data access interface 52 and may be prevented from being accessed by a user at the data memory/storage device 50 itself. Data stored in the data memory/storage device 50 is encrypted via encryption section 64 and when a non-authentication determination has been made at the authentication section 46, data in the data memory/storage device 50 cannot be accessed by the data access interface 52 nor at the data memory/storage device 50 since it is stored in an encrypted state. One exemplary embodiment of the present invention encrypts all the data on the data memory/storage device 50. Preventing access to data by any unauthorized means at both the output from the data access interface 52 and the data memory/storage device 50 increases the level of security of the data.

When a match has been made between pre-stored biometric identification data and a read biometric at biometric reader 44, a decryption key is either retrieved from a key storage location 66 and used to decrypt data stored in the data memory/storage device 50, or a decryption key is generated to decrypt data in the data memory/storage device 50 and subsequently stored in a key storage location 66.

A generated decryption key may be provided by using a user's biometric as read by the biometric reader 44 on the actuatable biometric input device 42 to provide a user-supplied decryption key. Since each user's biometric is unique, a very strong or secure key may be created from the user's biometric.

Additionally, if authentication section 46 determines no match between pre-stored biometric identification data and the read biometric at biometric reader 44, encryption section 64 may begin encryption of the data stored in the data memory/storage device 50 if the data has not yet been encrypted.

Standard encryption techniques such as AES-512 or AES-256 may be used to encrypt only a portion or all the data blocks in the data memory/storage device 50.

A timer section 68 sets a countdown timer after the authentication section 46 has determined that a match has been made between the read biometric at the biometric reader 44 and the pre-stored biometric identification data and thereafter allows access to a user of the data at the data memory/storage device 50 at the data access interface 52 via the system bus 54. The countdown timer may be set to be any period of time whereupon expiration of the countdown timer causes the disabling of access by a user to data in the data memory/storage device 50 and to data output to the data access interface 52.

Once the countdown timer has expired and access by a user has been disabled, the encryption section 64 may encrypt a portion or all of the data in the data memory/storage device 50. To re-access the encrypted data, either at the data memory/storage device 50 or the data access interface 52, a user must re-authenticate their biometric with the biometric reader 44 via authentication section 46 to cause decryption of the data in the memory/storage device 50 via the decryption section 60 to re-access the data.

A condition monitor 70 monitors the data storage and access device 40 for a number of exemplary conditions that cause the condition monitor 70 to communicate a timer suspension/reset signal to a timer suspension/reset section 72 that either suspends or resets the countdown timer of the timer section 68. This feature of the invention is beneficial to prevent the countdown timer from restricting access to the data when it is determined via the condition monitor 70 that a user is actively accessing the data or operating the data storage and access device 40.

The condition monitor 70 may simultaneously monitor a number of different conditions that trigger a timer suspension or reset signal to suspend or reset the countdown timer of the timer section 68. These exemplary conditions may include re-authentication made by a user on the biometric actuatable biometric input device 44, operation of functional control or operation made by a user on any other key or input device 74 on the data storage and access device 40, when decrypted data is being accessed by a user at the data access interface 52, or when an auxiliary data access device 76 in communication with the data access interface 52 of the data storage and access device 40 is accessing decrypted data. Each of these conditions will be further described in detail below.

The first above-described condition exists when re-authentication is made by a user on the biometric actuatable biometric input device 44, and is determined by the condition monitor 70 via the system bus 54. When the authentication section 46 determines that there is a valid authentication by a user, the condition monitor 70 determines the re-authentication and generates a timer suspension or reset signal to be transmitted to the timer suspension/reset section 72 to cause the countdown timer in timer section 68 to be either suspended or reset. The period of time for suspending the countdown timer may be set at varying intervals between a few seconds and longer periods of time, whereas resetting the timer causes restarting a predetermined countdown timer interval.

The second above-described condition exists when a functional control or key operation is made by a user on any other key or input device 74 and is determined by the condition monitor 70 via the system bus 54. The determining of a functional control or key operation by the condition monitor 70 causes the generation of a timer suspension or reset signal that is transmitted to the timer suspension/reset section 72 to cause the countdown timer in timer section 68 to be either suspended or reset. Again, the period of time for suspending the countdown timer may be set at varying intervals between a few seconds or longer, whereas resetting the timer causes restarting a predetermined countdown timer interval.

The third above-described condition exists when decrypted data is being accessed by a user at the data access interface 52. The condition monitor 70 judges when data access interface 52 is either outputting data on a video display 54 and/or outputting audio to audio output 56. The determination of any ongoing access to data stored in the data memory/storage device 50 at the data access interface 52 causes generation of a timer suspension or reset signal to be transmitted to the timer suspension/reset section 72 to cause the countdown timer in timer section 68 to be either suspended or reset. In this instance, the countdown timer may be suspended as long as data is continuously output at the data access interface 52. When there is no longer any determination of access to data stored in the data memory/storage device 50 at the data access interface 52, a timer suspension signal is terminated and a countdown timer (e.g., in timer section 68) resumes.

The fourth above-described condition exists when an auxiliary data access device 76 is determined to be in communication with the data access interface 52 and/or when data is being accessed by the auxiliary data access device 76 from the data access interface 52. Condition monitor 70 determines an auxiliary data access device 76 being in communication with the data access interface 52 and causes generation of a timer suspension or reset signal to be transmitted to the timer suspension/reset section 72 to cause the countdown timer in timer section 68 to be either suspended or reset. In this instance, as above, the countdown timer may be suspended as long as communication is determined between the auxiliary data access device 76 and the data access interface 52 and/or data is being accessed by the auxiliary data access device 76 from the data access interface 52. When there is no longer any determination of communication between the data access interface 52 and the auxiliary data access device 76 and/or the determination of data being accessed by the auxiliary data access device 76, the timer suspension or reset signal is terminated and the countdown timer resumes.

The auxiliary data access device 76 may be provided with a wired communication device or a wireless communication protocol and device to establish and maintain communication with the data access interface 52. An exemplary example of the auxiliary data access device 76 may be a pair of wired (see FIG. 3A) or wireless (see FIG. 3B) headphones for playback of audio via the audio output 56 of the data access interface 52, or an external video display in combination with additional audio output (not shown).

Additionally, the auxiliary data access device 76 may be provided with a sensor 78 that determines if the auxiliary data access device 76 is in physical contact with a user. Sensor 78 may be a mechanical switch, a proximity switch, a thermal sensor, or the like, and is able to determine whether a user is either wearing, or in continuous contact with, the auxiliary data access device 76.

An additional condition to be monitored by the condition monitor 70 may be judging if the output from sensor 78 indicates that the auxiliary data access device 76 is in physical contact with a user, thereby causing the condition monitor 70 to output a suspension or reset signal causing the countdown timer of the timer section 68 to be suspended or reset during access to data on the auxiliary an access device 76. This additional condition of monitoring the sensor 78 output would provide an additional second condition to the condition of determining if data is in communication with or being accessed by the auxiliary data access device 76. A timer suspension or reset signal may be generated by the condition monitor 70 when data is judges as being accessed by the auxiliary data access device 76 but the sensor 78 indicates there is no physical contact with a user.

The data storage and access device 40 of FIG. 2 may be a computer having an actuatable biometric input device 42 integrated with one or more keys of a keyboard as illustrated in FIG. 1A. Additionally, the data storage and access device 40 of FIG. 2 may be a portable cell phone or a portable media playback device, such as an MP3/MPEG player that is able to store and play back audio and/or video files. Current technology also incorporates portable media playback device functionality into many wireless telecommunication products such as mobile phones that may also be easy adapted to include the biometric authentication devices, systems and methods of the present invention.

Figure 3A:
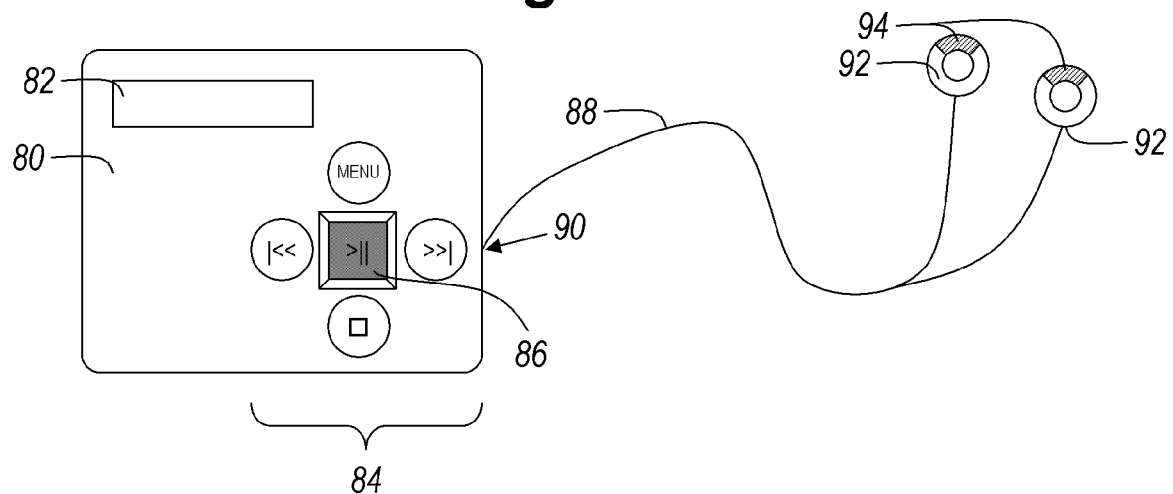
FIG. 3A illustrates a second exemplary embodiment of the biometric authentication device, according to a first configuration of an exemplary aspect of the present invention.

FIG. 3A illustrates one exemplary configuration of a second embodiment of the present invention providing an MP3/audio player 80 provided with a display output 82, a function button section 84 which includes an actuatable biometric input device 86 similar to the actuatable biometric input device illustrated in FIGS. 1A and 1B, and auxiliary data access device 88 in the form of a set of headphones connected to the MP3/audio player 80 at an audio output jack 90. Each earpiece 92 of the headphones may be provided with a sensor 94 to determine whether a user is wearing either of the earpieces 92.

Figure 3B:
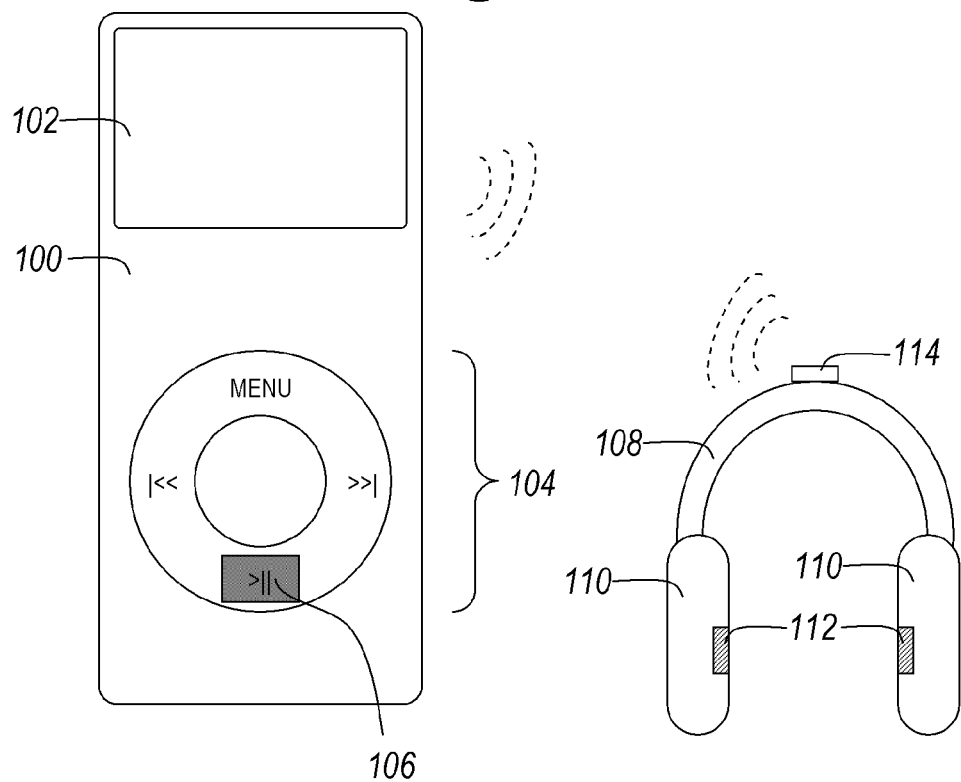
FIG. 3B illustrates a second exemplary embodiment of the biometric authentication device, according to a second configuration of an exemplary aspect of the present invention.

FIG. 3B illustrates a second exemplary configuration of the second embodiment of the present invention providing an MP3/MPEG or audio/video player 100 provided with an integrated video display 102, a function button/switch section 104 which includes an actuatable biometric input device 106 similar to the actuatable biometric input device illustrated in FIG. 1D, and an auxiliary data access device 108 in the form of a pair of wireless headphones. Auxiliary data access device 108 may be provided with a pair of earpieces 110 that may each be equipped with a sensor 112 to determine whether a user is wearing the headphones 108. A wireless transceiver 114 is provided on the headphones 108 for communication with a corresponding transceiver on the audio/video player 100 (not shown). Wireless communication protocols between the wireless transceiver 114 and the audio/video player 100 may include any short range high bandwidth transmission protocols including Bluetooth, wireless USB (Universal Serial Bus), and the like.

Figure 4:
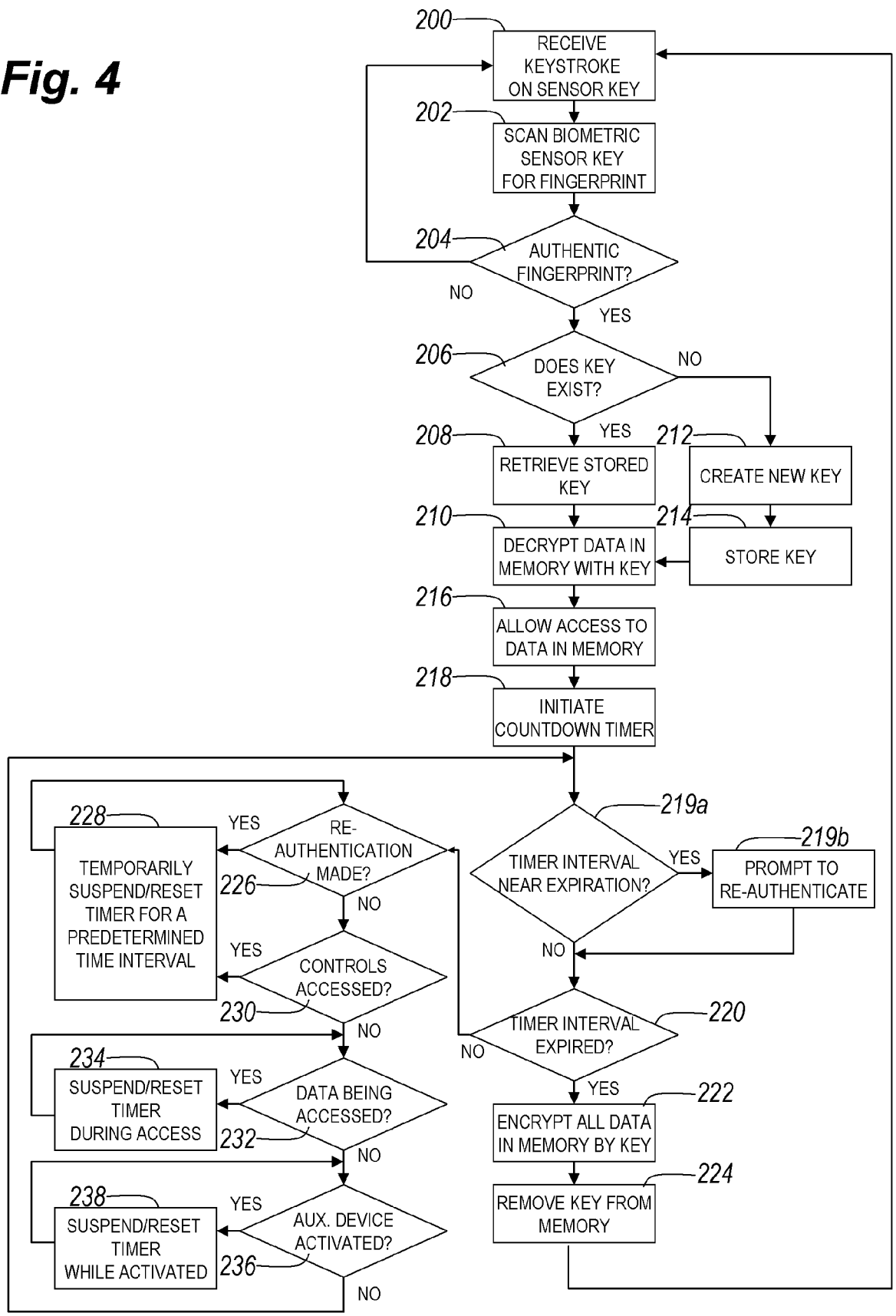
FIG. 4 illustrates a method of an exemplary embodiment of the biometric authentication device, according to an exemplary aspect of the present invention.

FIG. 4 illustrates a method of biometric authentication to provide and restrict access to data on a data storage and access device. The system components with respect to FIG. 2 will be exemplary referenced in the method's description provided below.

First, a keystroke is received (step 200) on actuatable biometric input device 42. The biometric reader 44 scans (step 202) the biometric (e.g., fingerprint) of the user used to contact the actuatable biometric input device 42 and determines by the authentication section 46 whether the received biometric corresponds to pre-stored biometric identification data, thereby determining whether the received biometric is authentic. If the biometric is determined (step 204) not to be authentic, (e.g., a "NO" in step 204), a system reverts back to wait for the reception of a keystroke on the actuatable biometric input device 42.

Additionally, a thermal sensor 10 may be used when a keystroke is received (step 200) to determine the presence of a user contacting the actuatable biometric input device 44 which provides an additional level of authentication in conjunction with the biometric authentication (step 204) as previously mentioned.

If the authentication section 46 determines (step 204) that the read biometric is authentic, the system then determines (step 206) whether a stored decryption key exists in a key storage location 66 for decrypting data stored in the data memory/storage device 50. A stored key is retrieved (step 208) and data in the data memory/storage device 50 is decrypted (step 210) with the retrieved key. If it is determined that a stored decryption key does not exist in the key storage location 66, a new decryption key is created (step 212) (which may be based on the user's scanned biometric), the new key is stored (step 214) at the key storage location 66, and data in the data memory/storage device 50 is decrypted (step 210) with the newly generated key.

Once the data in the data memory/storage device 50 is decrypted, the system allows access (step 216) to the data in the data memory/storage device 50 via the data access interface 52. Access to the data (step 216) may also include access to certain read/modify/write functions to the data in the data memory/storage device 50. Accessing functions to read/modify/write the data (step 216) may be based on a tiered authentication structure of biometric authentication such that certain authenticated users are able to perform certain functions on the data in the data memory/storage device 50 that may be different from other authenticated users and may depend on their level of authentication.

Decryption of the data in the data memory/storage device 50 or initial access to data at the data access interface 52 causes the timer section 68 to initiate a countdown timer (step 218).

A determination is made (step 219a) when the timer interval approaches a set (e.g., predetermined) quantity of time near the expiration of the timer interval. This interval may be an interval either defined by the user or preprogrammed into the electronic device. The set quantity of time may be an interval, for example, of 30 seconds, or any other time interval that would allow a user to re-authenticate the electronic device on the biometric sensor without interrupting playback of a media presentation or data accessibility. The electronic device then prompts the user to re-authenticate (step 219b) by actuating the biometric reader.

Once the timer interval at the timer section 68 has expired, encryption section 64 encrypts (step 222) the data on the data memory/storage device 50 with the key stored in the key storage location 66 to prevent unauthorized access at the data access interface 52 and on the data memory/storage device 50. At the conclusion of the data encryption, the key is removed (step 224) and erased from the key storage location 66 such that the key no longer exists on the data storage and access device 40.

If the timer interval at the timer section 68 has not expired, and if the condition monitor 70 determines at (step 226) if any re-authentication has been made on the actuatable biometric input device by a biometric read and the biometric sensor 44, the condition monitor 70 sends a timer suspension or reset signal that temporarily suspends or resets a countdown timer for a predetermined time interval (step 228).

Likewise, if the countdown timer interval at the timer section 68 has not expired, and if the condition monitor 70 determines (step 230) if any functional controls have been accessed on the data storage and access device 40, the condition monitor 70 sends a timer suspension or reset signal that temporarily suspends or resets a countdown timer for a predetermined time interval (step 228).

If the countdown timer interval at the timer section 68 still has not expired, and if the condition monitor 70 determines (step 232) if any data is being accessed at the data access interface 52, the condition monitor 70 sends a timer suspension or reset signal that suspends or resets (step 234) the countdown timer during the period that the data is being accessed.

Furthermore, if the countdown timer interval at the timer section 68 still has not expired, and if the condition monitor 70 determines at (step 236) that an auxiliary data access device 76 is in communication with and/or accessing data from the data access interface 52, the condition monitor 70 sends a timer suspension or reset signal that suspends or resets (step 238) the countdown timer during the period that the auxiliary access device 76 is in communication with and/or accessing data from the data access interface 52.

Without the timer suspension/reset features of the present invention, a data storage and access device would lock itself after the countdown timer expires even if the user were listening to audio programming, just as laptop computer locks up or enters a "sleep" mode after determining that the keyboard has not been used for a predetermined amount of time even though the user may still be viewing a document on the computer screen.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim should be construed as a disclaimer of any interest in or right to an equivalent of any element or feature of the amended claim.

What is claimed is:

1. A biometric authentication device, comprising:
an input device that one of generates a signal and completes a circuit when said input device is actuated by a user's touch, said input device comprising an actuation portion configured to be actuated by a user's touch;
a biometric reader integrally disposed on said actuation portion of the input device such that the biometric reader reads a biometric of a user as the user actuates said actuation portion of said input device to one of generate said signal and complete said circuit;
an authentication function that authenticates said read biometric to generate one of a data access allowance function based on authentication of said read biometric and a data access prevention function based on non-authentication of said read biometric;
a decryption section that decrypts data in a data storage device when said authentication function generates said data access allowance function for said user to access decrypted data; and
an encryption section that encrypts said data of said data storage device when said authentication function generates said data access prevention function thereby preventing a user from accessing said data,
wherein data access is determined solely on authentication of the biometric of the user.

2. The biometric authentication device of claim 1, wherein said data access allowance function permits contents of said storage device to be accessed, and
wherein said data access prevention function prevents access to contents of said storage device.

3. The biometric authentication device of claim 1, wherein said data access prevention function prevents unauthorized access to data in said storage device, and prevents reading of said data in said storage device.

4. The biometric authentication device of claim 1, further comprising:
a thermal sensor that determines a thermal presence of the user on said input device.

5. The biometric authentication device according to claim 1, wherein said biometric comprises at least one of:
a fingerprint;
hand geometry; and
a hand vein pattern.

6. A portable electronic device comprising:
an actuatable biometric input device comprising:
an input device that one of generates a signal and completes a circuit when actuated by a user's touch, said input device comprising an actuation portion configured to be actuated by a user's touch; and
a biometric reader integrally disposed on said actuation portion of the input device such that the biometric reader reads a biometric of a user as the user actuates said actuation portion of said input device to one of generate said signal and complete said circuit;
a data storage and access device comprising:
a storage device that stores data;
a data access interface that allows data to be accessed by a user;
an authentication section that authenticates said biometric read on said biometric reader to generate one of a data access allowance function based on authentication of said biometric input to said actuatable biometric input device, and a data access prevention function based on non-authentication of said biometric input to said actuatable biometric input device;
a decryption section that decrypts said data in said data storage and access device when said authentication section generates said data access allowance function for said user to access decrypted data; and
an encryption section that encrypts said data of said data storage and access device when said authentication section generates said data access prevention function thereby preventing a user from accessing said data,
wherein data access is determined solely on authentication of the biometric of the user,
wherein said data access allowance function permits data in said data storage and access device to be accessed at said data access interface, and
wherein said data access prevention function prevents access to data in said data storage and access device.

7. The portable electronic device of claim 6, further comprising:
a timer section that sets a countdown timer after said data access allowance function prepares said data to be accessed.

8. The portable electronic device of claim 7, further comprising one of:
a timer suspension section that suspends said countdown timer when said timer suspension section determines the existence of a specific condition; and
a timer reset section that resets an interval of said countdown timer when said timer reset section determines the existence of a specific condition.

9. The portable electronic device of claim 8, wherein said specific condition comprises at least one of:
when a re-authentication is made by a user on the biometric actuatable biometric input device;
when a functional control is activated by a user on said data storage and access device;
when decrypted data is accessed at said data access interface by said user; and
when an auxiliary device capable of accessing said decrypted data is in communication with said data storage and access device.

10. The portable electronic device of claim 8, further comprising:
an auxiliary device in communication with said data storage and access device,
wherein said auxiliary device comprises at least one of a wired and a wireless device in communication with said data storage and access device.

11. The portable electronic device of claim 10, wherein said auxiliary device further comprises:
a sensor that determines when said auxiliary device is in contact with said user,
wherein said specific condition comprises when said sensor determines said auxiliary device is not in contact with said user.

12. A portable electronic device comprising:
a data storage device that stores data;
a data access interface that allows said data to be accessed by a user;
at least one input device that one of generates a signal and initiates a function when actuated by a user's touch, said at least one input device comprising an actuation portion configured to be actuated by a user's touch;
a biometric reader integrally disposed on said actuation portion of the input device such that the biometric reader reads a biometric of a user as the user actuates said actuation portion of said input device to one of generate said signal and complete said circuit;

a decryption section that decrypts said stored data when an authentication section determines a user may access said decrypted data based on an authenticated biometric input to said biometric reader; and an encryption section that encrypts said data when said authentication section determines said user is prevented from accessing said data based on a non-authenticated biometric input to said biometric reader, wherein data access is determined solely on authentication of the biometric of the user.

13. The portable electronic device according to claim 12, wherein said biometric comprises at least one of:

a fingerprint;

hand geometry; and a hand vein pattern.

14. The portable electronic device of claim 12, further comprising:

a timer section that sets a countdown timer after said decrypted data is accessed, wherein said data is encrypted by said encryption section after said countdown timer has expired.

15. The portable electronic device of claim 14, further comprising one of:

a timer suspension section that suspends said countdown timer when a specific condition exists; and a timer reset section that resets an interval of said countdown timer when a specific condition exists.

16. The portable electronic device of claim 15, wherein said specific condition comprises at least one of:

when an authenticated biometric is read by said biometric reader;

when a functional control is activated by a user on said data storage and access device;

when decrypted data is being accessed by said user; and when an auxiliary device capable of accessing said decrypted data is in communication with said data storage and access device.

17. The portable electronic device of claim 16, further comprising:

an auxiliary device in communication with said data storage and access device, wherein said auxiliary device further comprises:

at least one of a wired and a wireless communication device with said data storage and access device; and a sensor that determines when said auxiliary device is in contact with said user, wherein said specific condition further comprises:

when said sensor determines said auxiliary device is not in contact with said user.

18. A portable electronic device comprising:

an actuatable biometric input device comprising:

an input device that one of generates a signal and completes a circuit when actuated by a user's direct contact, said input device comprising at least one key on a keypad configured to be actuated by a user's direct; and a biometric reader integrally disposed on said at least one key on said keypad of the input device such that the biometric reader reads a fingerprint biometric of a user as the user actuates said at least one key on said keypad of said input device to one of generate said signal and complete said circuit;

a data storage and access device comprising:

a storage device that stores data;

a data access interface that allows data to be accessed by a user; and an authentication section that authenticates said fingerprint biometric read on said biometric reader to generate one of a data access allowance function based on authentication of said biometric input to said actuatable biometric input device, and a data access prevention function based on non-authentication of said biometric input to said actuatable biometric input device, wherein data access is determined solely on authentication of the fingerprint biometric of the user, wherein said data access allowance function permits data in said data storage and access device to be accessed at said data access interface, and wherein said data access prevention function prevents access to data in said data storage and access device, wherein said data storage and access device further comprises:

a decryption section that decrypts said stored data when said authentication section determines the user may access said decrypted data based on an authenticated biometric input to said biometric reader;

an encryption section that encrypts said data when said authentication section determines said user is prevented from accessing said data based on a non-authenticated biometric input to said biometric reader;

a timer section that sets a countdown timer after said decrypted data is accessed, said data being encrypted by said encryption section after said countdown timer has expired;

a timer suspension section that suspends said countdown timer when said timer suspension section determines the existence of a specific condition; and a timer reset section that resets an interval of said countdown timer when said timer reset section determines that a re-authentication is made by a user on the biometric actuatable biometric input device.

* * * * *